US009635622B2

(12) United States Patent
Park et al.

(10) Patent No.: US 9,635,622 B2
(45) Date of Patent: Apr. 25, 2017

(54) ENERGY SAVING METHOD AND APPARATUS THEREFOR IN COMMUNICATION SYSTEM

(71) Applicant: Samsung Electronics Co., Ltd, Gyeonggi-do (KR)

(72) Inventors: Youngjun Park, Seoul (KR); Kiyoung Han, Gyeonggi-do (KR); Seungdo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/912,055

(22) PCT Filed: Aug. 13, 2014

(86) PCT No.: PCT/KR2014/007543
§ 371 (c)(1),
(2) Date: Feb. 12, 2016

(87) PCT Pub. No.: WO2015/023130
PCT Pub. Date: Feb. 19, 2015

(65) Prior Publication Data
US 2016/0205637 A1    Jul. 14, 2016

(30) Foreign Application Priority Data
Aug. 13, 2013  (KR) ...................... 10-2013-0095795

(51) Int. Cl.
*H04B 7/00* (2006.01)
*H04W 52/34* (2009.01)
(Continued)

(52) U.S. Cl.
CPC ..... *H04W 52/343* (2013.01); *H04W 52/0206* (2013.01); *H04W 52/241* (2013.01); *H04W 52/143* (2013.01); *Y02B 60/50* (2013.01)

(58) Field of Classification Search
CPC .......... H04W 52/0206; H04W 52/143; H04W 52/241; H04W 52/343
(Continued)

(56) References Cited

U.S. PATENT DOCUMENTS

2008/0233967 A1*  9/2008  Montojo ............. H04W 72/082
                                                    455/452.2
2011/0171930 A1    7/2011  Yoon
(Continued)

FOREIGN PATENT DOCUMENTS

KR    10-2011-0102589    9/2011
KR    10-2012-0064519    6/2012
(Continued)

OTHER PUBLICATIONS

International Search Report dated Nov. 21, 2014 in connection with International Patent Application No. PCT/KR2014/007543, 5 pages.
(Continued)

*Primary Examiner* — Keith Ferguson

(57) ABSTRACT

The present invention relates to an energy saving method and a centralized control device for receiving load information and SRS (Sounding Reference Signal) information of a cell from a base station, identifying whether an energy saving trigger condition is satisfied by using the received load information, identifying whether an energy saving condition is satisfied by using the received SRS information if the energy saving trigger condition is satisfied, and transmitting a transmission power management request message to the base station if the energy saving condition is satisfied. Further, the present invention provides a base station and a transmission power management method for the base station which manages a transmission power of a
(Continued)

cell corresponding to a transmission power management request message received from the centralized control device.

20 Claims, 9 Drawing Sheets

(51) Int. Cl.
*H04W 52/02* (2009.01)
*H04W 52/24* (2009.01)
*H04W 52/14* (2009.01)

(58) Field of Classification Search
USPC ........ 455/522, 69, 68, 500, 517, 452.1, 453, 455/422.1, 403, 67.11, 560, 561, 550.1, 455/127.1–127.3, 426.1, 426.2, 445, 507, 455/508, 515, 509; 370/310, 318, 328, 370/329, 338, 343
See application file for complete search history.

(56) References Cited

U.S. PATENT DOCUMENTS

| | | |
|---|---|---|
| 2011/0222418 A1 | 9/2011 | Kang et al. |
| 2012/0122512 A1 | 5/2012 | Nammi et al. |
| 2013/0119778 A1 | 5/2013 | Jung |
| 2013/0155936 A1 | 6/2013 | Deng et al. |
| 2014/0188296 A1 | 7/2014 | Oh et al. |

FOREIGN PATENT DOCUMENTS

| | | |
|---|---|---|
| KR | 10-2013-0042602 | 4/2013 |
| KR | 10-2013-0051848 | 5/2013 |
| WO | 03036815 A1 | 5/2003 |

OTHER PUBLICATIONS

Written Opinion of the International Searching Authority dated Nov. 21, 2014 in connection with International Patent Application No. PCT/KR2014/007543, 5 pages.

3GPP TR 36.927 V11.0.0, "3rd Generation Partnership Project; Technical Specification Group Radio Access Network; Evolved Universal Terrestrial Radio Access (E-UTRA); Potential Solutions for Energy Saving for E-UTRAN (Release 11", Sep. 2012, 22 pages.

Extended European Search Report dated Mar. 13, 2017 in connection with European Application No. 14836251.0, 12 pages.

Zhisheng Niu, et al., "Cell Zooming for Cost-Efficient Green Cellular Networks", IEEE Communications Magazine, IEEE Service Center, Piscataway, vol. 48, No. 11, Nov. 1, 2010, 6 pages.

Jyrki T. J. Penttinen, "LTE/SAE Deployment Handbook", Nov. 23, 2011, retrieved from the Internet: http://eu.wiley.com/WileyCDA/WileyTitle/productCd-0470977264.html, retrieved Mar. 3, 2017, pp. 126-127.

* cited by examiner

ENERGY SAVING METHOD AND APPARATUS THEREFOR IN COMMUNICATION SYSTEM

CROSS-REFERENCE TO RELATED APPLICATION(S)

The present application claims priority under 35 U.S.C. §365 to International Patent Application No. PCT/KR2014/007543 filed Aug. 13, 2014, entitled "ENERGY SAVING METHOD AND APPARATUS THEREFOR IN COMMUNICATION SYSTEM", and, through International Patent Application No. PCT/KR2014/006789, to Korean Patent Application No. 10-2013-0095795 filed Aug. 13, 2013, each of which are incorporated herein by reference into the present disclosure as if fully set forth herein.

TECHNICAL FIELD

The present invention relates to a method and an apparatus for energy saving and, more particularly, to a method and an apparatus for controlling a transmission power of a cell by using load information and radio wave environment information.

BACKGROUND ART

Technologies of managing a transmission power of a base station in a wireless communication system are required for effective saving of energy in a communication system. Related to saving a transmission power, a technology of managing a transmission power of a base station (eNB: evolved Node B) by an EMS (Element Management System) is discussed in 3GPP TR 36.927.

1) No assistance: When increasing a user transmission power of a cell that is currently decreased because of an increase of a traffic load, it is not easy to know which cell transmission power should be increased. A method is discussed for increasing a transmission power by randomly selecting a specific cell from cells located adjacent to the cell whose traffic load is increased.

2) OAM (Operations, Administration and Maintenance) predefined "low-load periods" policies: When increasing a user transmission power of a cell that is currently decreased because of an increase of a traffic load, an EMS provides a "low-load period" counter value of cells whose transmission powers are decreased. A method is discussed for increasing a transmission power of the most appropriate cell with reference to "low-load period" counter values of each cell.

3) IoT (Internet of Things) measurements: When increasing a user transmission power of a cell that is currently decreased because of an increase of a traffic load, measurement of IoT is requested to adjacent cells. A method is discussed for increasing a transmission power of the most proper cell by using the measured IoT values of the adjacent cells.

4) UE (User Equipment) measurements: When increasing a user transmission power of a cell that is currently decreased because of an increase of a traffic load, transmission powers of adjacent cells are temporarily increased and transmission of a reference signal is requested. A method is discussed for increasing a transmission power of the most proper cell included in a measurement report if a terminal (UE) receives a reference signal and generates a measurement report.

5) Positioning information: When increasing a user transmission power of a cell that is currently decreased because of an increase of a traffic load, a method is discussed for increasing a transmission power of the most appropriate cell by combining a location of a terminal (UE), a location of a cell, and transmission power information of the cell.

However, the methods of managing a transmission power defined by 3GPP TR 36.927 has the following limitations. The no assistance method cannot give an optimal result because a cell is randomly selected to increase the transmission power. The OAM predefined "low-load periods" policies method cannot properly reflect the current radio wave situation because the EMS provides the "low-load period" counter provided by using a statistical value. Further, the IoT measurements method can select a cell that is not appropriate for an instantaneous value because the adjacent cells with a reduced transmission power measure and report the IoT only when requested. Further, the UE measurement method can generate an overhead because the measurement report is additionally set and received by a UE in a state of a cell having a high traffic load. Therefore, it is difficult to collect sufficient measurement reports for selecting an optimum cell. Further, the positioning information method can select an inappropriate cell because a big difference is generated between an actual radio wave environment and a radio wave environment modelled with transmission and reception locations of a radio wave.

Additionally, the method of identifying an increase or a decrease of a transmission power based on statistical data has the following problems. The statistical data must be newly collected because statistical characteristics change every time that a new cell is installed or an existing cell is uninstalled because of an increase/decrease of long-term user traffic. Therefore, the conventional method generates additional costs according to a change of the long-term user traffic because much time and high costs are required to collect reliable statistical data.

Further, additional costs are generated because new statistical data must be collected if a radio wave environment changes according to a change of a geographic feature due to construction of a new building or public works. If short-term user traffic increases greatly, the method based on statistical data cannot properly reflect the traffic change. If the transmission power is not increased promptly when the user traffic changes rapidly, the telecommunication quality experienced by a mobile communication user can deteriorate. Further, an optimum transmission power for the current situation cannot be provided because the statistical data is generated based on old information.

Related to prediction of a handover possibility, when a cell transmission power is decreased, a user receiving a service in a corresponding cell is handed over to an adjacent cell. However, if the adjacent cell cannot provide a radio wave intensity sufficient for enabling handover of the user, handover of the user may fail. With the technology currently defined by 3GPP TR 36.927, it is impossible to decrease the cell transmission power by predicting the success of handover.

Further, related to a throughput of a communication network, if a cell transmission power is increased, the transmission power of the corresponding cell may generate an interference to an adjacent cell. Accordingly, sometimes the total throughput of the communication network may not increase in accordance with the increase of cell transmission power. Therefore, with the technology currently defined by 3GPP TR 36.927, it is impossible to increase appropriately the cell transmission power by predicting a throughput improvement effect of a communication network.

DISCLOSURE OF INVENTION

Technical Problem

An object of the present invention is to provide a transmission power management method and an apparatus therefor that provide greater improvement than the above discussed transmission power management method in a communication system.

The present invention utilizes a centralized control device (resource coordinator) and provides a method and an apparatus for managing a transmission power consumption of a cell by cooperation between each base station (eNB) and the centralized control device.

Solution to Problem

According to an embodiment of the present invention, an energy saving method in a centralized control device includes receiving load information and SRS (Sounding Reference Signal) information of a cell from a base station, identifying whether an energy saving trigger condition is satisfied by using the received load information, identifying whether an energy saving condition is satisfied by using the received SRS information if the energy saving trigger condition is satisfied, and transmitting a transmission power management request message to the base station if the energy saving condition is satisfied.

According to another embodiment of the present invention, a centralized control device includes a communication unit configured to execute a data communication with a base station and an OAM server and an energy management control unit configured to receive load information and SRS (Sounding Reference Signal) information from the base station, to identify whether an energy saving trigger condition is satisfied by using the received load information, to identify whether an energy saving condition is satisfied by using the received SRS information if the energy saving trigger condition is satisfied, and to transmit a transmission power management request message to the base station if the energy saving condition is satisfied.

According to another further embodiment of the present invention, a method for managing a transmission power in a base station includes transmitting load information and SRS information of a cell to a centralized control device, receiving a transmission power management request corresponding to the transmitted information from the centralized control device, and increasing or decreasing a transmission power corresponding to the management request.

According to another further embodiment of the present invention, a base station for managing a transmission power includes a communication unit configured to execute a data communication and a power management control unit configured to control transmission of load information and SRS information of a cell to a centralized control device, to receive a transmission power management request corresponding to the transmitted information from the centralized control device, and to increase or decrease a transmission power corresponding to the management request.

Advantageous Effects

According to embodiments of the present invention, a new transmission power management method can be provided by using a centralized control device.

Further, according to embodiments of the present invention, an improved power management method can be provided by using load information and radio wave environment information, and a method for optimizing a transmission power can be provided by simultaneously reflecting cumulative data and the current situation.

Further, according to embodiments of the present invention, a transmission power of a cell can be managed by predicting the success of a handover of a user and by predicting a throughput improvement effect of a communication network.

MODE OF THE INVENTION

Hereinafter, embodiments of the present invention are described in detail with reference to the accompanying drawings so that those skilled in the art can easily implement the embodiments. However, the present invention can be implemented in various different forms and thereby is not limited to the embodiments described in this disclosure. The same reference symbols are used throughout the drawings to refer to the same or like parts, and detailed descriptions of well-known functions and structures incorporated herein may be omitted to avoid obscuring the subject matter of this disclosure.

Figure 1:
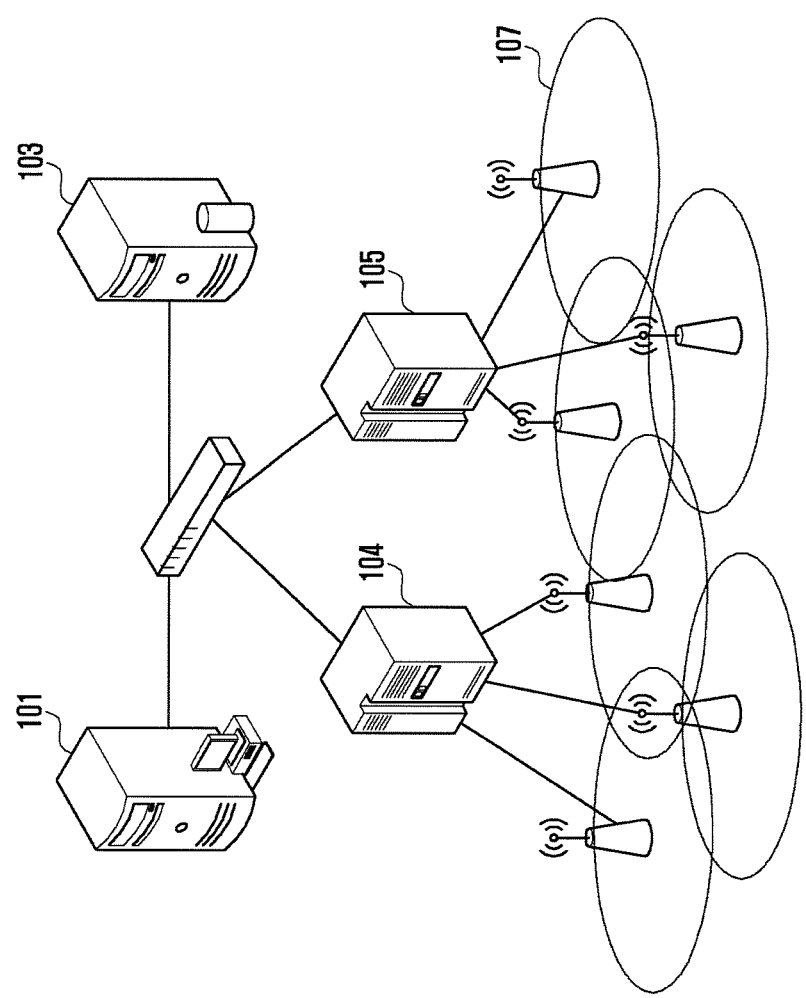
FIG. 1 is a schematic drawing illustrating a communication system according to an embodiment of the present invention.

FIG. 1 is a schematic drawing illustrating a communication system according to an embodiment of the present invention.

Referring to FIG. 1, the communication system may include an OAM server (Operation and Administration and Maintenance Server) 101, resource coordinator 103, and base stations (eNB) 104 and 105.

The OAM server 101 can receive an operator input of the communication system and report the result of increasing/decreasing a transmission power to the operator. The operator can input information of an energy saving trigger condition and an energy saving condition by using the OAM server 101. The OAM server 101 can set or transmit the information of the energy saving trigger condition and the energy saving condition received from the operator to the resource coordinator 103.

The resource coordinator 103 may be called a "centralized control device". The centralized control device 103 can control the transmission power of each cell by transmitting a message commanding an increase or decrease of transmission power to the base stations 104 and 105. The centralized control device 103 can store the information of the energy saving trigger condition and the energy saving condition by receiving information from the OAM server 101. The centralized control device 103 can collect radio wave environment information of a mobile communication user and load information of each cell from the base station. The centralized control device 103 can decide increases or decreases of the transmission power of each cell by using information received from the base stations 104 and 105 and information received from the OAM server 101. According to the result of deciding increases od decreases, the centralized control device 103 can transmit a message commanding to increase or decrease the transmission power to the base station.

The base station (eNB) 105 communicates with the centralized control device 103 and can control cells within its charge. Further, the base station 105 can transmit transmission power management information of adjacent cells in charge of the adjacent base station 104 to the adjacent base station 104. Namely, the base station 105 can exchange information with the centralized control device 103. The base station 105 can transmit load information and radio wave environment information of cells to the centralized control device 103 and receive transmission power management information corresponding to the transmitted information from the centralized control device 103.

If an increase of a cell transmission power is requested by the centralized control device 103, the base station 105 identifies a corresponding cell within its charge and can increase a power of a corresponding cell if the cell is under its own control. If the cell is not under its own control according to the result of identification, the base station 105 can transmit a message commanding an increase in the transmission power of the cell to the base station 104 in charge of the corresponding cell by using an X2 communication (X2 cell activation).

If a decrease of a cell transmission power is requested by the centralized control device 103, the base station 105 identifies whether the corresponding cell is within its charge and can reduce the power of the cell if the corresponding cell is within its charge. If the cell is not within its charge according to the result of identification, the base station 105 may reject the corresponding request received from the centralized control device 103.

Figure 2:
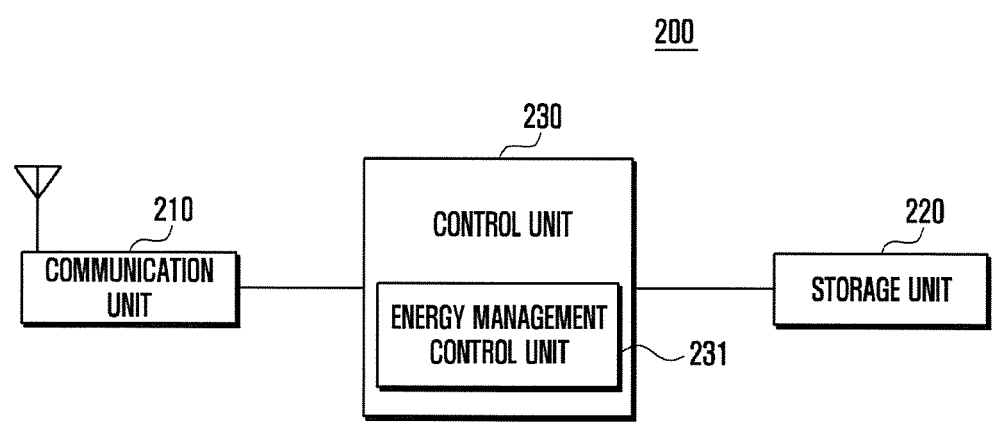
FIG. 2 is a block diagram illustrating a centralized control device according to an embodiment of the present invention.

FIG. 2 is a block diagram illustrating a centralized control device according to an embodiment of the present invention.

Referring to FIG. 2, the centralized control device 200 may include a communication unit 210, storage unit 220, and control unit 230.

The communication unit 210 can perform a data communication with a base station and an OAM server. The communication unit 210 can received information of an energy saving trigger condition and an energy saving condition from the OAM server 101. Further, the communication unit 210 can collect radio wave environment information of a mobile communication user and load information of each cell from the base station. Based on this, the communication unit 210 can transmit a message to the base station commanding control of transmission powers of each cell.

The storage unit 220 can store programs or commands for operating the centralized control device 200. The control unit 230 can control performance of an energy saving operation by using the programs or commands stored in the storage unit 220. Further, the storage unit 220 can store information received from the communication unit 210 and information processed from the received information.

The control unit 230 can control general operations of the centralized control device 200. The control unit 230 may further include an energy management control unit 231.

According to an embodiment of the present invention, the energy management control unit 231 can receive load information and SRS information of a cell from the base station, identify whether an energy saving trigger condition is satisfied by using the received load information, identify whether an energy saving condition is satisfied by using the received SRS information if the energy saving trigger condition is satisfied, and control transmission of a transmission power management request message to the base station if the energy saving condition is satisfied.

Further, the energy management control unit 231 can identify as a transmission power decrease trigger condition if a cumulative cell load value is less than a predetermined first threshold value and a transmission power of a corresponding cell can be decreased by comparing the cumulative cell load value calculated by using the received cell load information with the first threshold value.

Further, after decreasing the transmission power, the energy management control unit 231 can identify an energy saving condition by identifying whether an SINR value of a new cell satisfies the minimum SINR condition to be provided for a mobile communication user.

Further, after decreasing the transmission power, the energy management control unit 231 can identify an energy saving condition by identifying whether a total throughput of a new cell satisfies a predetermined total throughput condition.

Further, the energy management control unit 231 can identify as a transmission power increase trigger condition if a cumulative cell load is greater than a predetermined second threshold value and a transmission power of a corresponding cell can be increased or a transmission power of an adjacent cell can be increased by comparing the cumulative cell load value calculated from the received cell load information with the second threshold value.

Further, after increasing the transmission power, the energy management control unit 231 can identify an energy saving condition by identifying whether an SINR value of a new cell satisfies the minimum SINR condition to be provided for a mobile communication user.

Further, after increasing the transmission power, the energy management control unit 231 can identify the energy saving condition by identifying whether a total throughput of a new cell satisfies a predetermined total throughput condition.

In the meantime, although the control unit 230 and the energy management control unit 231 are configured in separate blocks and a technology of performing each block has been described above, this description is only for convenience in describing the technology and each function may not be divided like this.

Figure 3:
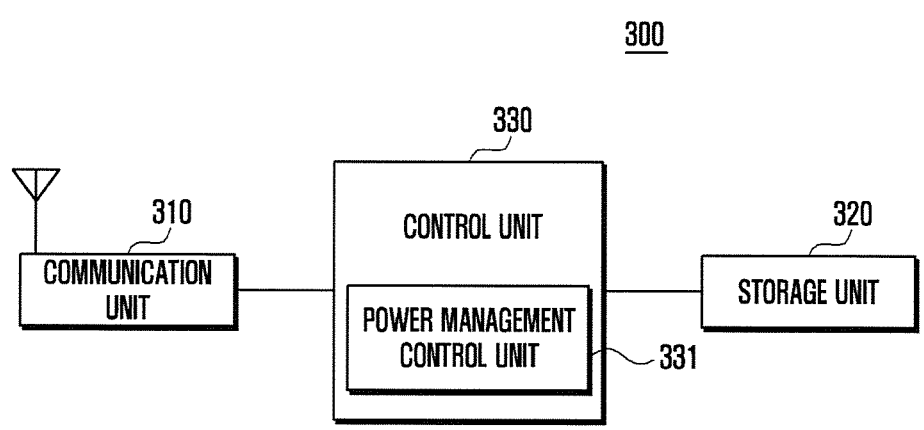
FIG. 3 is a block diagram illustrating a base station according to an embodiment of the present invention.

FIG. 3 is a block diagram illustrating a base station according to an embodiment of the present invention.

Referring to FIG. 3, the base station 300 may include a communication unit 310, storage unit 320, and control unit 330.

The communication unit 310 can perform a data communication with a centralized control device and a terminal. The communication unit 310 can transmit radio wave environment information and cell load information collected from the terminal to the centralized control device. The communication unit 310 can receive information from the centralized control device for commanding the control of a cell transmission signal of its own cell or a cell of an adjacent base station. The communication unit 310 can relay the signal received from the centralized control device to the adjacent base station.

The storage unit 320 can store programs and commands for operating the base station 300. The control unit 330 can control performance of a transmission power management operation by using the programs or commands stored in the storage unit 320. Further, the storage unit 320 can store information received through the communication unit 310 and information processed from the received information.

The control unit 330 can control general operations of the base station 200. The control unit 330 may further include a power management control unit 331.

According to an embodiment of the present invention, the power management control unit 331 can transmit cell load information and SRS information to the centralized control device, receive a transmission power management request corresponding to the transmitted information from the centralized control device, and control increase or decrease of a transmission power corresponding to the management request.

Further, the power management control unit 331 identifies whether the transmission power management request is a transmission power increase request or a transmission power decrease request and identifies whether the transmission power increase request is for its own base station cell or for an adjacent base station cell if the transmission power management request is the transmission power increase request.

Further, the power management control unit 331 can control relaying of the received transmission power management request to the adjacent base station if the transmission power increase request is for the adjacent base station cell.

In the meantime, although the technology of configuring the control unit 330 and the power management control unit 331 in separate blocks and controlling the performance of each block has been described above, the description is only for convenience in describing the technology and each function may not be divided like this.

Figure 4:
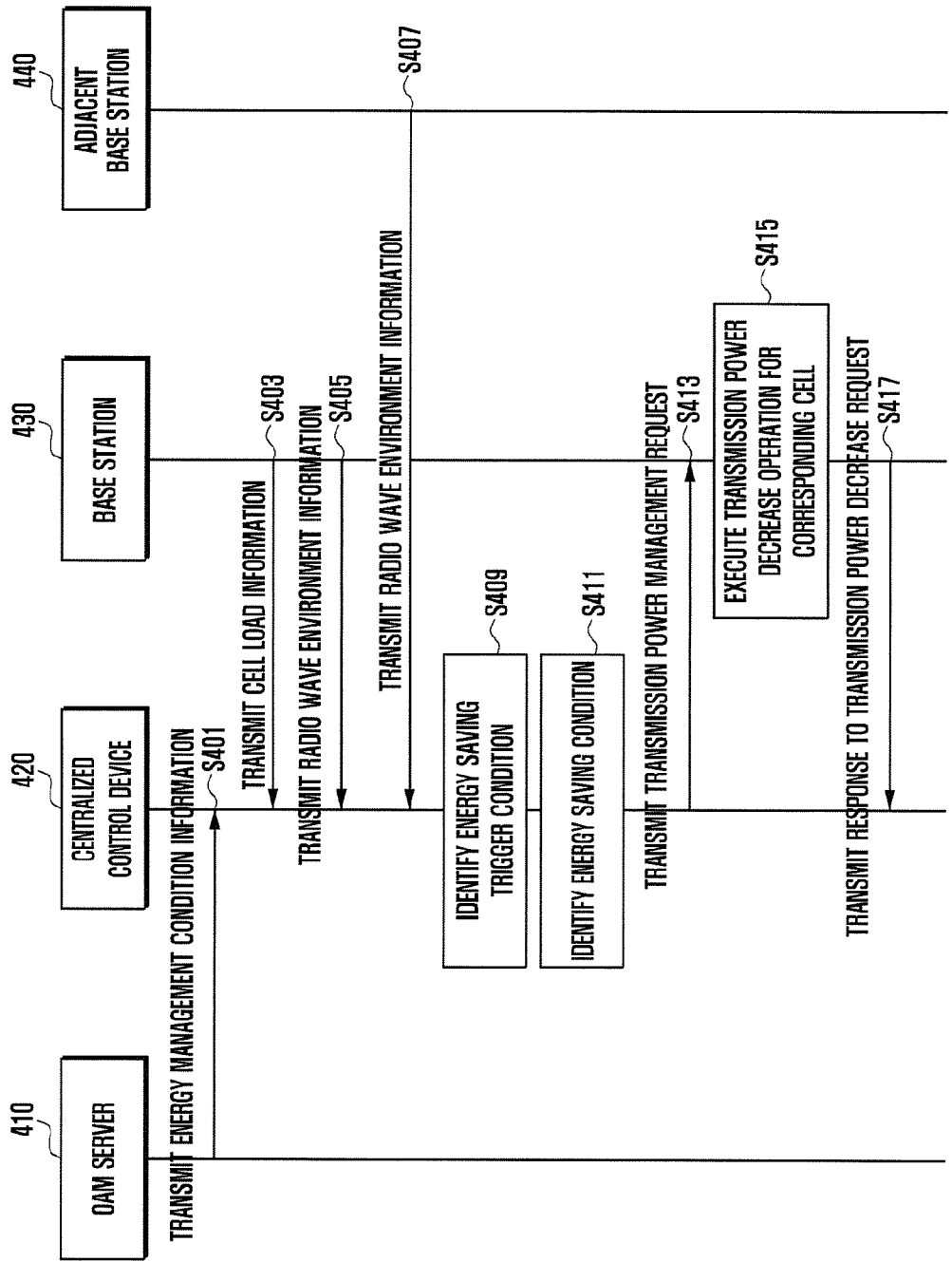
FIG. 4 is a flowchart illustrating a procedure of decreasing a transmission power in a communication system according to an embodiment of the present invention.

FIG. 4 is a flowchart illustrating a procedure of decreasing a transmission power in a communication system according to an embodiment of the present invention.

Referring to FIG. 4, a communication system according to an embodiment of the present invention may include a centralized control device 420 and a base station 430. The communication system may further include an OAM server 410 and an adjacent base station 440.

The OAM server 410 can receive an operator input of the communication system and report a transmission power increase/decrease result to the operator. The operator can input information of an energy saving trigger condition and an energy saving condition by using the OAM server 410. The OAM server 410 sets or transmits the information of the energy saving trigger condition and the energy saving condition received from the operator to the centralized control device 420 at step S401.

The centralized control device (resource coordinator) 420 collects load information of each cell at step S403. The load information can be collected from the base station 430. The base station 420 can receive the load information in predetermined intervals. The interval may be a cell load information report period t1 of the base station 420.

The centralized control device 420 receives radio wave environment information from the base station 430 at step S405. Further, the centralized control device 420 receives radio wave environment information from an adjacent base station 440 at step S407. The radio wave environment information may include information of a terminal receiving a service from cells of each base station and SRS information received from cells of each base station. Further, the centralized control device 420 can receive information of a terminal receiving a service from all the cells of the base stations and the SRS information. The centralized control device 420 can receive the radio wave environment information from the base stations 430 and 440 in predetermined intervals.

The cell load information and the radio wave environment information can be received in predetermined intervals. Accordingly, regardless of the steps illustrated in FIG. 4, the load information and the radio wave environment information can be received in intervals. Further, an energy saving condition can be identified by continuously receiving SRS information even when a cell does not send a transmission power.

The centralized control device 420 identifies whether an energy saving trigger condition is satisfied based on a predetermined energy saving trigger condition at step S409. The centralized control device 420 can identify the energy saving trigger condition based on the cell load information received from the base station 430. A method of identifying an energy saving trigger condition will be described later in more detail.

If the energy saving trigger condition is satisfied according to the result of identification, the centralized control device 420 identifies whether an energy saving condition is satisfied at step S411. The centralized control device 420 can identify the energy saving condition based on the SRS information. A method of identifying an energy saving condition will be described later in more detail.

If the energy saving condition is satisfied, the centralized control device 420 transmits a transmission power management request message to the base station 430 at step 413. The transmission power management request message may include an identifier commanding increase or decrease of a cell transmission power and an identifier of a cell of which transmission power will be increased or decreased. The cell identifier may be a global identifier.

The base station 430 receives from centralized control device 420 the identifier commanding decrease of a transmission power and the identifier of the cell of which transmission power will be decreased and performs a transmission power management operation for a corresponding cell at step 415.

After performing the transmission power management operation for the corresponding cell, the base station 430 can transmit a response to the centralized control device 420 corresponding to the request of step S413.

Figure 5:
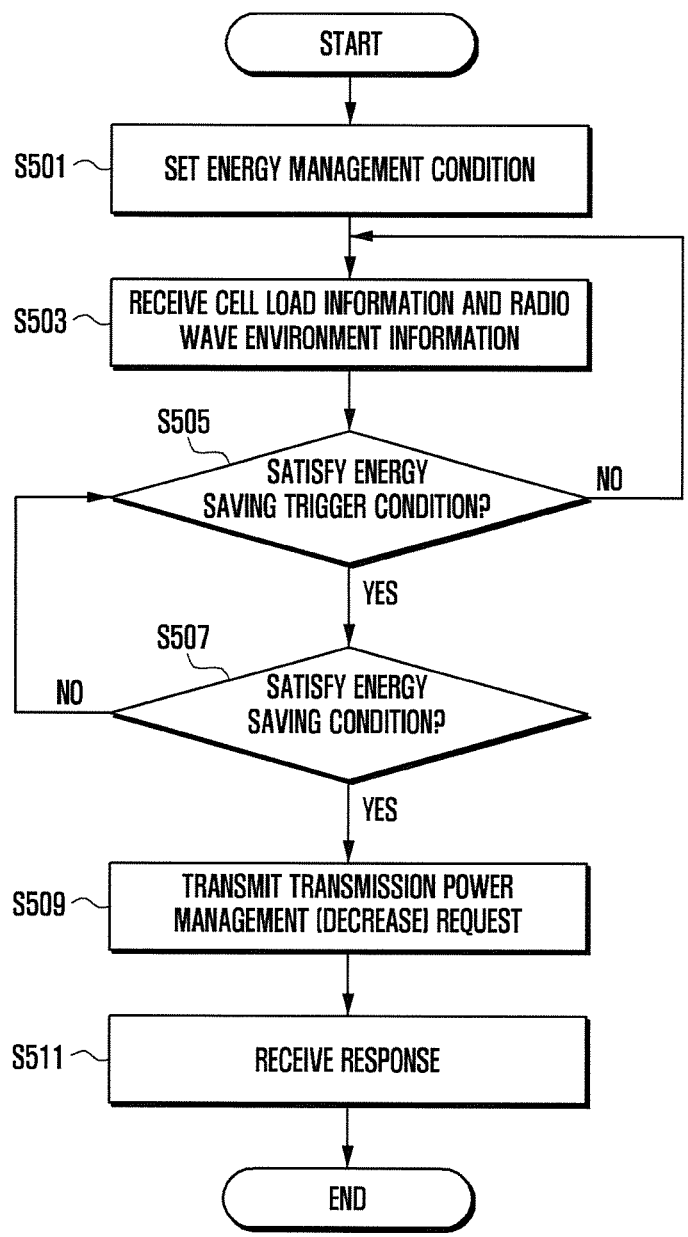
FIG. 5 is a flowchart illustrating an operation of requesting a transmission power decrease in a centralized control device according to an embodiment of the present invention.

FIG. 5 is a flowchart illustrating an operation of requesting a transmission power decrease in a centralized control device according to an embodiment of the present invention.

The centralized control device receives an energy management condition setting from the OAM server at step S501. The energy management condition can be set by using the following variables.

α: weighted load variable for calculating an energy saving trigger condition, $0 \leq \alpha \leq 1$ β1: weighted variable for calculating an energy saving condition, $0 \leq \beta 1 \leq 1$ β2: weighted variable for calculating an energy saving condition, $0 \leq \beta 2 \leq 1$ minRequiredSinr: minimum SINR (Signal to Interference plus Noise Ratio) to be provided for a mobile communication user loadThreshold 1: threshold value for identifying a cell transmission power decrease loadThreshold 2: threshold value for identifying a cell transmission power increase The centralized control device receives cell load information and radio wave environment information at step S503. The cell load information and the radio wave environment information are similar to those described at steps S403, S405, and S407.

The centralized control device identifies whether a corresponding cell satisfies an energy saving trigger condition by using the periodically received cell load information and the following formulas at step S505.

t1: cell load information report period of a base station j: cell index, $j \in J$ cellLoad(j,t): load value of cell j reported by the base station at time t $$\text{cumCellLoad}(j,t) = \alpha S \text{cumCellLoad}(j,t-t1) + (1-\alpha) S \text{cellLoad}(j,t) \quad \text{Formula 1}$$

In Formula 1, the cumCellload(j,t) is a cumulative cell load value of cell j at time t. The centralized control device can identify an energy saving trigger condition by using cumCellload(j,t), which is a cumulative cell load value of the current cell j periodically (t2) collected, loadThreshold 1, and loadThreshold 2. The period t2 of identifying a trigger condition by the centralized control device may be longer than period t1 of which the base station reports load information of each cell.

Hereinafter, a method for identifying an energy saving trigger condition is describe in detail.

First, a method for identifying a trigger condition for saving a transmission power of a cell is described.

1) If cumCellLoad(j,t) is less than loadThreshold 1 and the transmission power of cell j can be decreased, whether cell j satisfies an energy saving condition at step S507 can be identified.

2) If cumCellLoad(j,t) is less than loadThreshold 1 and the transmission power of cell j cannot be decreased, the identification is delayed until the next period by waiting for time t2.

3) If cumcellLoad(j,t) is equal to or greater than loadThreshold 1 and less than loadThreshold 2, the identification is delayed until the next period by waiting for time t2.

In the meantime, if the transmission power of cell j can be decreased, it is a case that the transmission power of cell j is greater than the minimum transmission power or the transmission power is switched on at cell j. Adversely, if the transmission power of cell j cannot be decreased, it is a case that the transmission power of cell j already reached the minimum transmission power or the transmission power is switched off at cell j.

Second, a method for identifying a trigger condition for increasing a transmission power of a cell is described.

1) If cumCellLoad(j,t) is equal to or greater than loadThreshold 2 and the transmission power of cell j can be increased, an operation of identifying an energy saving condition of cell j can be performed.

2) If cumCellLoad(j,t) is equal to or greater than loadThreshold 2 and the transmission power of cell j cannot be increased but an adjacent cell of cell j can increase the transmission power instead, the operation of identifying an energy saving condition for the adjacent cell of cell j can be performed.

3) If cumCellLoad(j,t) is equal to or greater than loadThreshold 2 and the transmission powers of both cell j and its adjacent cell cannot be increased, the operation of identifying can be delayed until the next period by waiting for time t2.

In the meantime, if the transmission power of cell j can be increased, it is a case that the transmission power of cell j is less than the maximum transmission power value or the transmission power is switched off at cell j. Adversely, if the transmission power of cell j cannot be increased, it is a case that the transmission power of cell j already reached the maximum transmission power value or the transmission power is switched on at cell j.

If cumCellLoad(j,t) is less than loadThreshold 1 and the transmission power of cell j can be decreased at step S505, the centralized control device proceeds to step S507 and identifies whether cell j satisfies the energy saving condition.

The centralized control device can identify the energy saving condition by using radio wave environment information received from the base station. The radio wave environment information may include:

i: index of terminal (UE), $i \in I$,

SRS(j,i): relative SRS reception power of UE I received by cell j, and

TxP(j): transmission power of cell j.

The centralized control device can identify the energy saving condition by using the following variables.

$s_i$: serving cell of UE i before decreasing transmission power TxP(j) of cell j $SINR_i$: reception SINR of UE i before decreasing transmission power TxP(j) of cell j $s_i^W$: new serving cell of UE i after decreasing transmission power TxP(j) of cell j $SINR_i^W$: reception SINR of UE i after decreasing transmission power TxP(j) of cell j First, before decreasing the transmission power TxP(j) of cell j, each UE $SINR_i$ can be calculated by using Formula 2 as follows.

$$SINR_i = \frac{SRS(s_i, i) sTxP(s_i)}{\sum_{k \in HJ} Q\{SRS(k, i) sTxP(j)\} + NI} \quad \text{Formula 2}$$

Second, after decreasing the transmission power TxP(j) of cell j, the $SINR_i^W$ of each UE can be calculated by using Formula 3 as follows. The transmission power can be decreased by steps or to the minimum value.

$$SINR_i^W = \frac{SRS(s_i^W, i) sTxP(s_i^W)}{\sum_{k \in HJ} Q\{SRS(k, i) sTxP(j)\} + NI} \quad \text{Formula 3}$$

Here, $s_i^W$ can be selected by using the following Formula 4.

$$SRS(s_i^W, i)ST \times P(s_i^W) = \max\{SRS(k,i)ST \times P(k)\}, \text{ for}$$
$$@k, k \in HJ \quad \text{Formula 4}$$

When decreasing the transmission power to the minimum value, the transmission power T×P(j) of cell j can be decided as the minimum value if values calculated by Formula 2 and Formula 3 satisfy the following Formula 5 and Formula 6 or either of them. (According to a setting made by an operator, conditions satisfying at least one of Formula 5 and Formula 6 can be used.) Formula 5 is used to identify whether the SINR of a terminal at a new serving cell after decreasing the transmission power satisfies the minimum SINR condition to be provided for a mobile communication user. Further, Formula 6 is used to identify whether a total throughput condition provided for the mobile communication user is satisfied.

$$SINR_i^W - \beta 1 \text{sminRequired} SINRE0, \text{ for } @i, i \in Hl \quad \text{Formula 5}$$

$$Q\log(1 + SINR_i^W)EQ(1 - \beta 2)\text{slog}(1 + SINR_i), \quad \text{Formula 6}$$
$$\text{for } @i, i \in Hl$$

When decreasing a transmission power of a cell, a user receiving a service in the corresponding cell may move to an adjacent cell. However, if the adjacent cell cannot provide a sufficient level of a radio wave intensity, a handover of the service may fail. In the embodiment of the present invention, the transmission power of a cell can be managed by predicting the success of the handover by using Formula 5.

Further, when increasing the transmission power of a cell, the transmission power of the corresponding cell can generate an interference to an adjacent cell. Accordingly, sometimes the total throughput of a communication network cannot be increased because of the increase of a cell transmission power. The embodiment of the present invention can manage a cell transmission power by predicting a throughput improvement effect through Formula 6.

As a method of decreasing the cell transmission power, the transmission power of a corresponding cell may be switched off, decreased to an optimized minimum value, or decreased to the minimum value by steps.

When decreasing the cell transmission power by steps, the transmission power is decreased by one step if Formula 5 and Formula 6 or either of them are satisfied by using a SINRi value of Formula 2 and $SINR_i^W$ value of Formula 3. Further, whether Formula 5 and Formula 6 or either of them are satisfied using the decreased transmission power is identified again, and the transmission power can be decreased by one more step if Formula 5 and Formula 6 or either of them are satisfied. If the formulas are not satisfied, the transmission power cannot be decreased more and may be set as the minimum transmission power of cell j that corresponds to the transmission power condition of the previous step.

If a new cell and its transmission power satisfy the energy saving condition at step S507, the centralized control device transmits a transmission power management request to the base station at step S509. The transmission power management request may include switching off a corresponding cell, decreasing transmission power of the corresponding cell, and selecting a new cell to be handed over by the terminal. The base station can manage the transmission power of the corresponding cell by using information of the received management request.

The centralized control device can receive a response corresponding to a transmission power management request from the base station which sent the transmission power management request at step S511.

Figure 6:
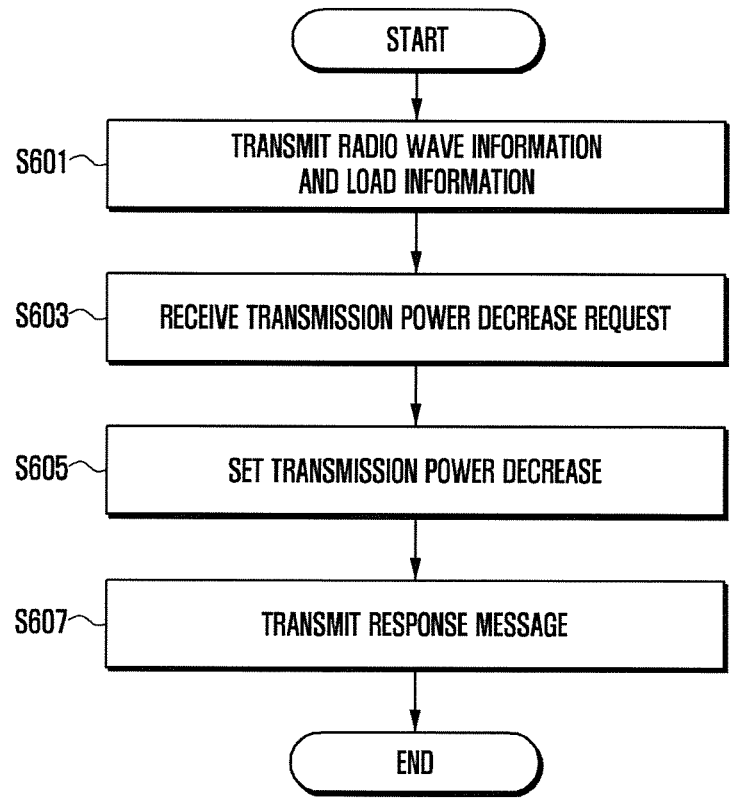
FIG. 6 is a flowchart illustrating an operation of decreasing a transmission power in a base station according to an embodiment of the present invention.

FIG. 6 is a flowchart illustrating an operation of decreasing a transmission power in a base station according to an embodiment of the present invention.

Referring to FIG. 6, the base station transmits radio wave environment information and cell load information to the centralized control device at step S601. The cell load information and the radio wave environment information are similar to those described at steps S403, S405, and S407.

The base station receives a request for decreasing the transmission power from the centralized control device at step S603. The transmission power management request may include requests for switching off a corresponding cell, decreasing the transmission power of the corresponding cell, and selecting a new cell to be handed over by the terminal.

The base station manages the transmission power of the corresponding cell by using information of the received management request at step S605. The base station can switch off the transmission power of the cell and decrease the transmission power value of the cell corresponding to the received management request.

The base station transmits a response for the transmission power decrease operation to the centralized control device at step S607. The base station can report to the centralized control device the operations performed by itself, such as switching off the transmission power of the corresponding cell and adjusting the transmission power of the corresponding cell to the minimum value.

Figure 7:
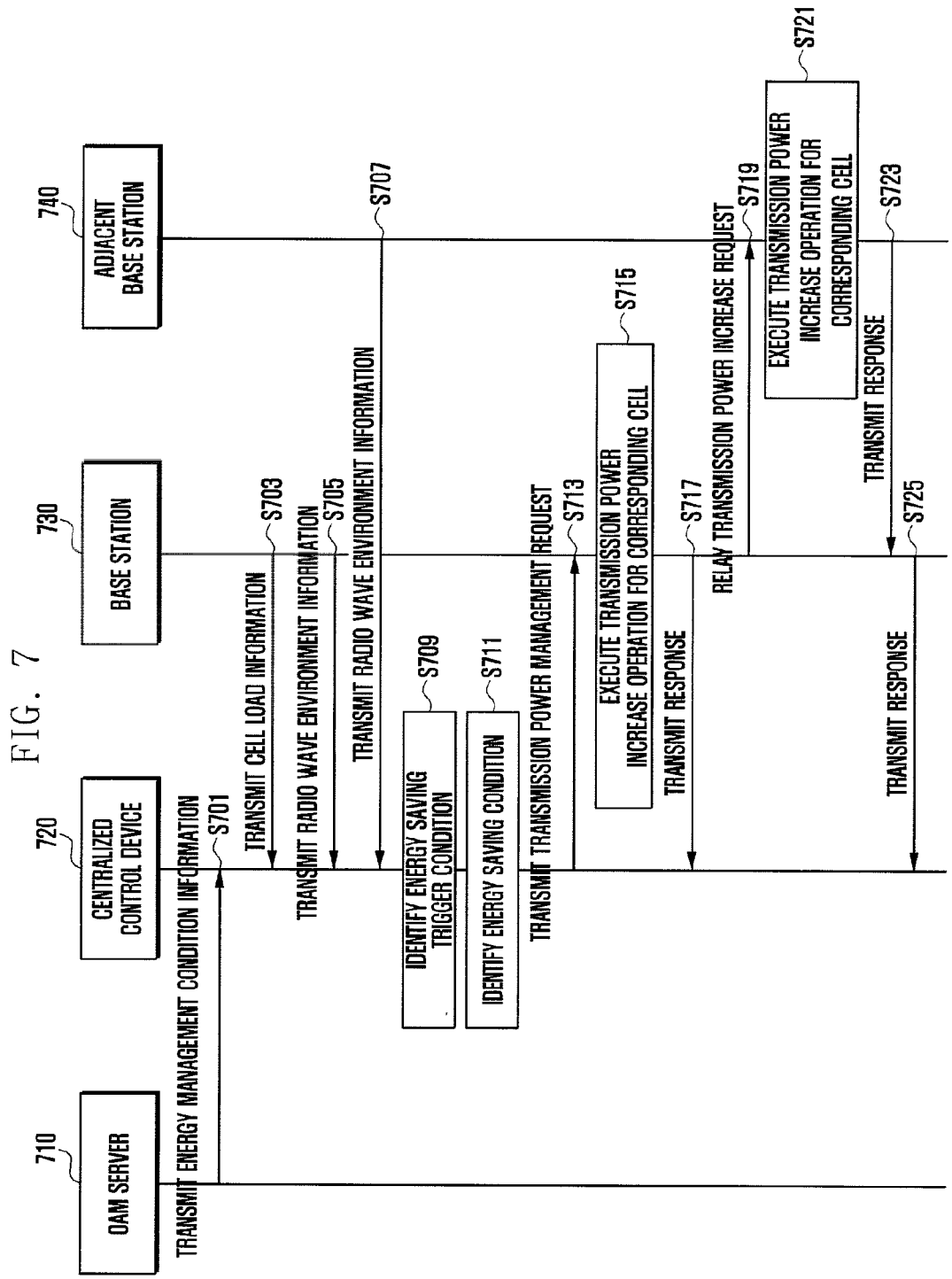
FIG. 7 is a flowchart illustrating a procedure of increasing a transmission power in a communication system according to an embodiment of the present invention.

FIG. 7 is a flowchart illustrating a procedure of increasing a transmission power in a communication system according to an embodiment of the present invention.

Referring to FIG. 7, the communication system according to an embodiment of the present invention may include a centralized control device 720 and a base station 730. The communication system may further include an OAM server 710 and an adjacent base station 740.

The OAM server 710 can receive an operator input of the communication system and report the result of a transmission power increase/decrease to the operator. The operator can input information of an energy saving trigger condition and an energy saving condition by using the OAM server 710. The OAM server 710 sets or transmits the information of the energy saving trigger condition and the energy saving condition received from the operator to the centralized control device 720 at step S701.

The centralized control device (resource coordinator) 720 collects load information of each cell at step S703. The load information can be collected from the base station 730. The base station 720 can receive the load information in predetermined intervals. The interval may be a period t1 of cell load information reported by the base station 720.

The centralized control device 720 receives radio wave environment information from the base station 730 at step S705. Further, the centralized control device 720 can receive the radio wave environment information from an adjacent base station 740 at step S707. The radio wave environment information may include information of a terminal receiving a service from each cell of the base station and SRS information received from cells of each base station. Further, the centralized control device 720 can receive information of a terminal receiving a service from all the cells of the base station and SRS information. The centralized control device 720 can receive the radio wave environment information from the base stations 730 and 740 in predetermined intervals.

The cell load information and the radio wave environment information can be received in predetermined intervals. Accordingly, regardless of the order of steps in FIG. 7, the load information and the radio wave environment information can be periodically received.

The centralized control device 720 identifies whether an energy saving trigger condition is satisfied based on a predetermined energy saving trigger condition at step S709. The centralized control device 720 can identify the energy saving trigger condition based on the cell load information received from the base station 730. A method for identifying an energy saving trigger condition will be described later in more detail.

If the energy saving trigger condition is satisfied according to the result of identification, the centralized control device 720 identifies whether an energy saving condition is satisfied at step S711. The centralized control device 720 can identify whether the energy saving condition is satisfied based on the SRS information. A method for identifying the energy saving condition will be described later in more detail.

If the energy saving condition is satisfied, the centralized control device 720 transmits a transmission power management request message to the base station 730 at step 713. The transmission power management request message may include an identifier commanding increase or decrease of the transmission power of a cell and an identifier of a cell whose transmission power will be increased or decreased.

The base station receives the identifier commanding decrease of the transmission power and the identifier of a cell whose transmission power will be decreased from the centralized control device 720 and performs a transmission power management operation for the corresponding cell at step S715.

After performing the transmission power management operation for the corresponding cell, corresponding to the request received at step S713, the base station 730 transmits a response to the centralized control device 720 at step S717.

In the meantime, the transmission power management request received by the base station 730 at step S713 may be a message including a transmission power management request for an adjacent cell of the base station 740. In this case, the base station 730 relays the power management request received from the centralized control device 720 to the adjacent base station 740 at step S719. The base station 740 which received the power management request performs a transmission power management operation for the corresponding cell at step S721.

After performing the transmission power management operation for the corresponding cell, corresponding to the request received at step S713 or S719, the adjacent base station 740 transmits a response at step S723. The response may be transmitted directly to the centralized control device 720 or to the base station 730.

If the adjacent base station 740 transmits a response to the base station 730, the base station 730 relays the received response to the centralized control device 720 at step S725.

Figure 8:
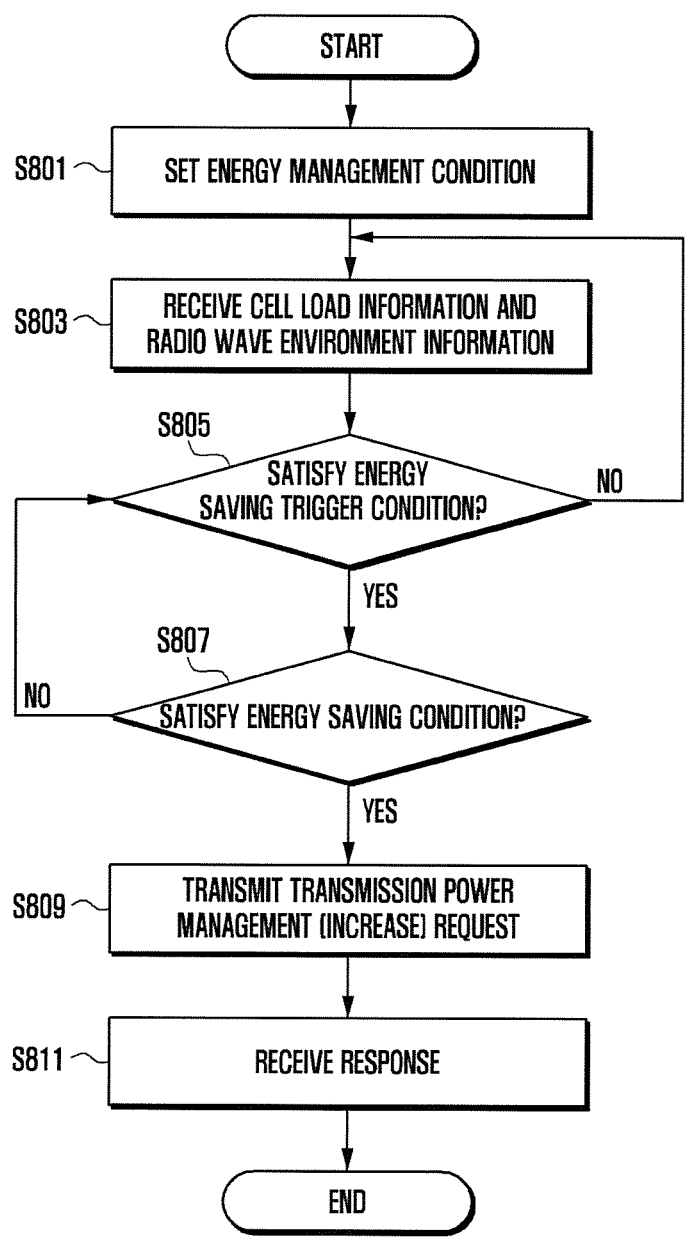
FIG. 8 is a flowchart illustrating an operation of requesting a transmission power increase in a centralized control device according to an embodiment of the present invention.

FIG. 8 is a flowchart illustrating an operation of requesting a transmission power increase in a centralized control device according to an embodiment of the present invention.

Referring to FIG. 8, the centralized control device receives an energy management condition from the OAM server at step S801. The energy management condition can be set with the following variables.

α: weighted load variable for calculating an energy saving trigger condition, $0 \leq \alpha \leq 1$ β1: weighted variable for calculating an energy saving condition, $0 \leq \beta1 \leq 1$ β2: weighted variable for calculating an energy saving condition, $0 \leq \beta2 \leq 1$ minRequiredSinr: minimum SINR (Signal to Interference plus Noise Ratio) to be provided for a mobile communication user loadThreshold 1: threshold value for identifying a cell transmission power decrease loadThreshold 2: threshold value for identifying a cell transmission power increase The centralized control device receives cell load information and radio wave environment information at step S803. The cell load information and the radio wave environment information are similar to those described at steps S403, S405, and S407.

The centralized control device identifies whether the energy saving trigger condition of a corresponding cell is satisfied by using the periodically received cell load information and the following formulas at step S805. The method for identifying the energy saving trigger condition is similar to that described at step S505 of FIG. 5, which is identified by using Formula 1.

The centralized control device can periodically (t2) identify the energy saving trigger condition by using cumulative cell load values of the current cell, such as cumCellload(j,t), loadThreshold 1, and loadThreshold 2.

Hereinafter, a method for identifying a trigger condition for increasing a transmission power of a cell is described.

1) If cumCellLoad(j,t) is equal to or greater than loadThreshold 2 and a transmission power of cell j can be increased, an operation of identifying an energy saving condition for cell j can be performed.

2) If cumCellLoad(j,t) is equal to or greater than loadThreshold 2 and the transmission power of cell j cannot be increased but a transmission power of an adjacent cell can be increased instead, an identification operation can be performed for the adjacent cell.

3) If cumCellLoad(j,t) is equal to or greater than loadThreshold 2 and transmission powers both of cell j and its adjacent cell cannot be increased, the identification is delayed until the next period by waiting for time t2.

In the meantime, if the transmission power of cell j can be increased, it is a case that the transmission power of cell j is less than the maximum transmission power value or the transmission power is switched off at cell j. Adversely, if the transmission power of cell j cannot be increased, it is a case that the transmission power of cell j already reached the maximum transmission power value or the transmission power is switched on at cell j.

If cumCellLoad(j,t) is greater than loadThreshold 2 and the transmission power of cell j can be increased at step S805, the centralized control device proceeds to step S807 and identifies whether an energy saving condition is satisfied for cell j.

The centralized control device can identify the energy saving condition by using the following variables.

si: serving cell of UE I before increasing a transmission power of a target cell SINRi: reception SINR before increasing a transmission power of a target cell $s_i^W$: new serving cell after decreasing a transmission power of a target cell $SINR_i^W$: reception SINR of UE i after decreasing a transmission power TxP(j) of a target cell target cell: adjacent cell of cell j The SINRi and the $SINR_i^W$ can be calculated by using the following formula.

First, before increasing the transmission power of a target cell, SINTRi of each terminal (UE) can be calculated as follows.

$$SINR_i = \frac{SRS(s_i, i)sTxP(s_i)}{Q\{SRS(k, i)sTxP(j)\} + NI} \quad \text{Formula 7}$$

Second, after increasing the transmission power of the target cell by using Formula 8, $SINR_i^W$ of each terminal (UE) can be calculated as follows. The transmission power can be increased by steps or to the maximum value.

$$SINR_i^W = \frac{SRS(s_i^W, i)sTxP(s_i^W)}{Q\{SRS(k, i)sTxP(j)\} + NI} \quad \text{Formula 8}$$

Here, can be selected by using the following Formula 9.

$$SRS(s_i^W, i)ST \times P(s_i^W) = \max\{SRS(k,i)ST \times P(k)\}, \text{ for } @k, kHJ \quad \text{Formula 9}$$

When increasing the transmission power to the maximum value, the transmission power of the target cell can be decided as the maximum value if values of Formulas 7 and 8 satisfy the following Formulas 10 and 11 or either of them. (According to a setting made by an operator, conditions satisfying at least one of Formulas 10 and 11 can be used.) Formula 10 is used to identify whether SINR of the terminal satisfies the minimum SINR condition at a new serving cell to be provided for a mobile communication user. Further, Formula 11 is used to identify whether a total throughput provided for the mobile communication user is satisfied. Formula 12 is used to identify the maximum value of the transmission power.

$$SINR_i^W - \beta 1 s minRequiredSINRE0, \text{ for } @i, iHl \quad \text{Formula 10}$$

$$Q\log(1 + SINR_i^W)EQ(1 - \beta 2)s\log(1 + SINR_i), \text{ for } @i, iHl \quad \text{Formula 11}$$

$$Q\log(1 + SINR_i^W), \text{ for } @i, iHl \quad \text{Formula 12}$$

When decreasing a transmission power of a cell, the user receiving a service from a corresponding cell may move to an adjacent cell. However, if the adjacent cell cannot provide a radio wave intensity of a sufficient level at which the user can hand over the service to the adjacent cell, the handover may fail. In the embodiment of the present invention, a transmission power of a cell can be managed by predicting the success of handover through Formula 5.

Further, when increasing the transmission power of a cell, the transmission power of the corresponding cell can generate an interference to the adjacent cell. Accordingly, sometimes the total throughput of the communication network may not increase because of the increase of a transmission power of a cell. In the embodiment of the present invention, the transmission power of the cell can be managed by predicting a throughput improvement effect through Formula 6.

As a method for increasing a transmission power of a cell, the transmission power of the corresponding cell can be switched on, the transmission power of the corresponding cell can be increased to an optimal maximum value, or the transmission power of the corresponding dell can be increased to the maximum value by steps.

When increasing the cell transmission power by steps, if Formulas 10 and 11 or either of them are satisfied by using the SINRi value of Formula 7 and $SINR_i^W$ value of Formula 8, Formula 12 is calculated. If Formula 10 and Formula 11 or either of them are satisfied after increasing the transmission power by one step, the transmission power can be increased by one more step. If the formulas are not satisfied, the transmission power cannot be increased any more, and the transmission power increased at the previous step may be set as the maximum transmission power satisfying the condition. Namely, whether Formula 10 and Formula 11 or either of them are satisfied by increasing the transmission power by steps is identified, and if Formula 10 and 11 or either of them are satisfied and Formula 12 gives a maximum value, the transmission of the cell can be set as the maximum value.

If a transmission power of a new cell satisfies the energy saving condition at step S807, the centralized control device transmits a transmission power management request to the base station at step S809. The transmission power management request may include requests for switching on a corresponding cell, increasing a transmission power of a corresponding cell, and selecting a new cell for hand over. The base station can manage the transmission power of the corresponding cell by using the information of received management request. Here, an identifier for increasing the transmission power of a target cell can be relayed.

The centralized control device receives a response from the base station which transmitted the transmission power management request at step S811.

Figure 9:
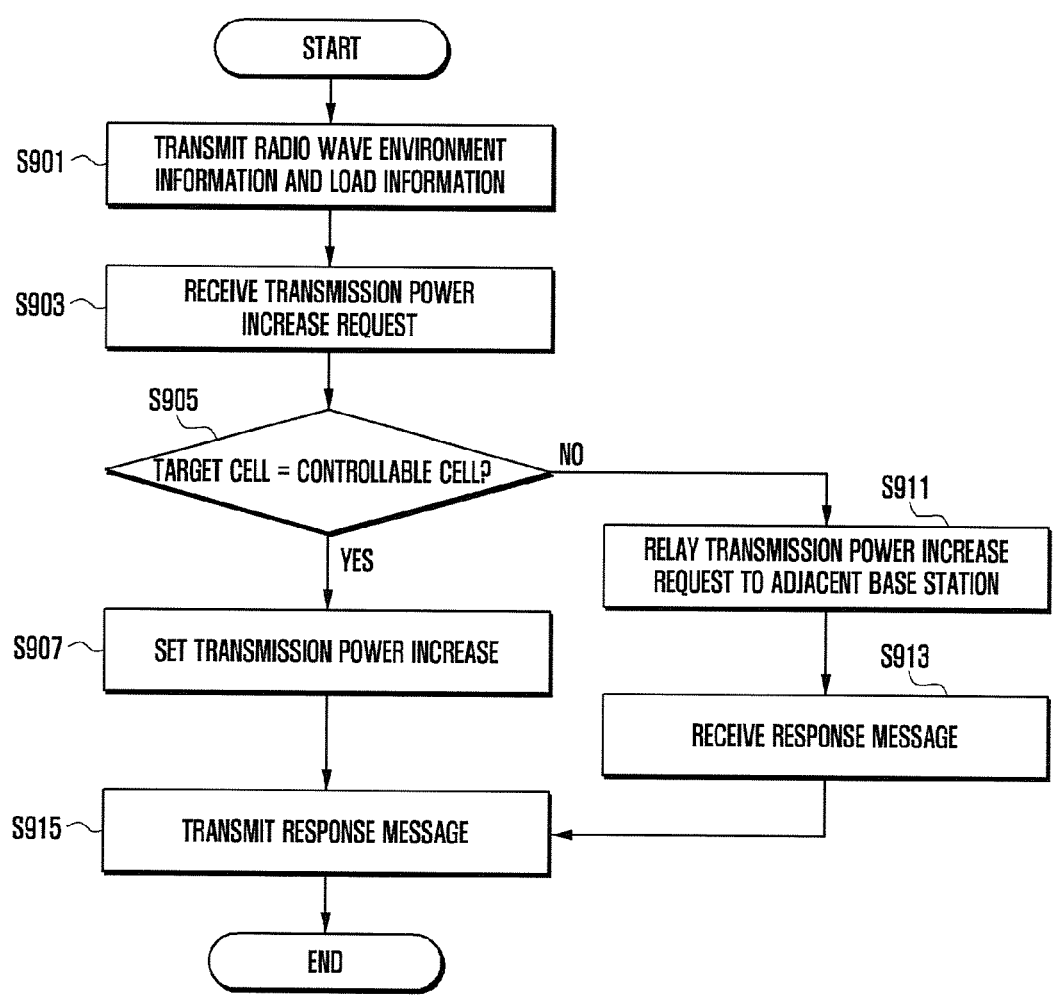
FIG. 9 is a flowchart illustrating an operation of decreasing a transmission power in a base station according to an embodiment of the present invention.

FIG. 9 is a flowchart illustrating an operation of decreasing a transmission power in a base station according to an embodiment of the present invention.

Referring to FIG. 9, the base station transmits radio wave environment information and cell load information to the centralized control device at step S901. The cell load information and the radio wave environment information are similar to those described at steps S403, S405, and S407.

The base station receives a request for increasing a transmission power from the centralized control device at step S903. The request for increasing a transmission power may include requests for switching on a corresponding cell, increasing a transmission power of the corresponding cell, and selecting a new cell to be handed over.

The base station identifies whether a target cell whose transmission power will be increased is a cell that it can control at step S905. Namely, the base station can identify whether the target cell is in its coverage.

If the target cell is a cell that it can control, the base station proceeds to step S907. The base station can increase the transmission power of the corresponding target cell by using the information of the received management request. The base station can switch on the transmission power of the corresponding cell or increase the transmission power value of the corresponding cell according to the received management request.

If the target cell is not a cell that it can control according to the result of identification (for example, an adjacent cell under the control of an adjacent base station), the base station proceeds to step S911. The base station can relay the information of the received management request to an adjacent base station. The adjacent base station which received the information can increase the transmission power of the corresponding target cell. The base station and the adjacent base station can communicate through an X2 cell Activation Request.

After increasing the transmission power, the adjacent base station can transmit a response to the base station. The base station receives a response message at step S913.

The base station transmits the response for the operation of increasing the transmission power to the centralized control device at step S913. The base station can report transmission power increase operations performed by itself, such as switching on a transmission power of a cell or adjusting the transmission power of the cell to the maximum value, to the centralized control device.

Although embodiments of the disclosure have been described in detail hereinabove, it should be understood that many variations and modifications of the basic inventive concept described herein will still fall within the spirit and scope of the disclosure as defined in the appended claims.

The invention claimed is:

1. A method for saving energy using a centralized control device, the method comprising:
receiving load information and sounding reference signal (SRS) information of a cell from a base station;
identifying whether an energy saving trigger condition is satisfied by using the received load info information;
identifying whether an energy saving condition is satisfied by using the received SRS information if the energy saving trigger condition is satisfied; and
transmitting a transmission power management request message to the base station if the energy saving condition is satisfied.

2. The method of claim 1, wherein identifying whether an energy saving trigger condition is satisfied comprises:
identifying, as a transmission power decrease trigger condition, whether a cumulative cell load value is less than a predetermined first threshold value and a transmission power of a corresponding cell can be decreased by comparing the cumulative cell load value calculated from the received cell load information with the first threshold value.

3. The method of claim 2, wherein identifying whether an energy saving condition is satisfied comprises:
identifying whether a signal to interference plus noise ratio (SINR) value of a new cell after decreasing the transmission power satisfies a minimum SINR condition to be provided for a mobile communication user.

4. The method of claim 2, wherein identifying whether an energy saving condition is satisfied comprises:
identifying whether a total cumulative throughput of a new cell after decreasing the transmission power satisfies a predetermined total throughput condition.

5. The method of claim 1, wherein identifying whether an energy saving trigger condition is satisfied comprises:
identifying, as a transmission power increase trigger condition, whether a cumulative cell load value is greater than a predetermined second threshold value and a transmission power of a corresponding cell or an adjacent cell can be increased by comparing the cumulative cell load value calculated from the received cell load information with the second threshold value.

6. The method of claim 5, wherein identifying whether energy saving condition is satisfied comprises:
identifying whether an SINR value of a new cell, after increasing the transmission power, satisfies a minimum SINR condition to be provided for a mobile communication user.

7. The method of claim 5, wherein identifying whether energy saving condition is satisfied comprises:
identifying whether a total cumulative throughput of a new cell after increasing the transmission power satisfies a predetermined total throughput condition.

8. A centralized control device comprising:
a communication unit configured to execute a data communication with a base station and an operations, administration, and maintenance (OAM) server; and
an energy management control unit configured to:
receive load information and sounding reference signal (SRS) information from the base station,
identify whether an energy saving trigger condition is satisfied by using the received load information,
identify whether an energy saving condition is satisfied by using the received SRS information if the energy saving trigger condition is satisfied, and
transmit a transmission power management request message to the base station if the energy saving condition is satisfied.

9. The centralized control device of claim 8, wherein the energy management control unit configured to identify, as a transmission power decrease trigger condition, whether a cumulative cell load value is less than a predetermined first threshold value and a transmission power of a corresponding cell can be decreased by comparing the cumulative cell load value calculated from the received cell load information with the first threshold value.

10. The centralized control device of claim 9, wherein the energy management control unit is configured to identify an energy saving condition by identifying whether a signal to interference plus noise ratio (SINR) value of a new cell after decreasing the transmission power satisfies a minimum SINR condition to be provided for a mobile communication user.

11. The centralized control device of claim 9, wherein the energy management control unit is configured to identify an energy saving condition by identifying whether a total cumulative throughput of a new cell after decreasing the transmission power satisfies a predetermined total throughput condition.

12. The centralized control device of claim 8, wherein the energy management control unit is configured to identify as a transmission power increase trigger condition whether a cumulative cell load value is greater than a predetermined second threshold value and a transmission power of a corresponding cell or an adjacent cell can be increased by comparing the cumulative cell load value calculated from the received cell load information with the second threshold value.

13. The centralized control device of claim 12, wherein the energy management control unit is configured to identify an energy saving condition by identifying whether an SINR value of a new cell, after increasing the transmission power, satisfies a minimum SINR condition to be provided for a mobile communication user.

14. The centralized control device of claim 12, wherein the energy management control unit is configured to identify an energy saving condition by identifying whether a total cumulative throughput of a new cell after increasing the transmission power satisfies a predetermined total throughput condition.

15. A method for managing a transmission power in a base station, the method comprising:
- transmitting load information and sounding reference signal (SRS) information of a cell to a centralized control device;
- receiving a transmission power management request corresponding to the transmitted information from the centralized control device; and
- increasing or decreasing a transmission power corresponding to the management request.

16. The method of claim 15, further comprising:
- identifying whether the transmission power management request is a transmission power increase request or a transmission power decrease request; and
- identifying whether the transmission power increase request is for a serving base station cell or for an adjacent base station cell if the transmission power management request is the transmission power increase request.

17. The method of claim 16, further comprising:
- relaying the received transmission power management request to an adjacent base station if the transmission power management request is a transmission power increase request for the adjacent base station.

18. A base station for managing a transmission power, the base station comprising:
- a communication unit configured to execute a data communication; and
- a power management control unit configured to:
  - control transmission of load information and sounding reference signal (SRS) information of a cell to a centralized control device,
  - receive a transmission power management request corresponding to the transmitted information from the centralized control device, and
  - increase or decrease a transmission power corresponding to the management request.

19. The base station of claim 18, wherein the power management control unit is configured to identify whether the transmission power management request is a transmission power increase request and identifies whether the transmission power increase request is for a serving base station cell or for an adjacent base station cell if the transmission power management request is the transmission power increase request.

20. The base station of claim 19, wherein the power management control unit is configured to control relay of the received transmission power management request to the adjacent base station if the transmission power increase request is for the adjacent base station.

* * * * *